(12) United States Patent
Wieneke et al.

(10) Patent No.: US 10,091,664 B2
(45) Date of Patent: Oct. 2, 2018

(54) SYSTEM AND METHODS FOR UNOBTRUSIVELY AND RELOCATEABLY EXTENDING COMMUNICATION COVERAGE AND SUPPORTING UNMANNED AERIAL VEHICLE (UAV) ACTIVITIES

(71) Applicant: The United States of America as represented by the Secretary of the Navy, Washington, DC (US)

(72) Inventors: Garry V Wieneke, Montgomery, IN (US); Gerry F Miller, Bedford, IN (US); Ameer Beitvashahi, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/721,869

(22) Filed: Sep. 30, 2017

(65) Prior Publication Data
US 2018/0027422 A1 Jan. 25, 2018

Related U.S. Application Data

(62) Division of application No. 15/155,672, filed on May 16, 2016, now Pat. No. 9,877,208.
(Continued)

(51) Int. Cl.
*H04W 16/26* (2009.01)
*H02S 20/32* (2014.01)
(Continued)

(52) U.S. Cl.
CPC ............. *H04W 16/26* (2013.01); *G01S 5/02* (2013.01); *H02S 20/32* (2014.12);
(Continued)

(58) Field of Classification Search
CPC .... H04W 88/08; H04W 16/20; H04B 7/2609; H04B 7/14; H04B 7/15; H04B 7/18504
See application file for complete search history.

(56) References Cited

U.S. PATENT DOCUMENTS

| 5,889,468 A * | 3/1999 | Banga | G08B 25/00 |
| | | | 340/522 |
| 9,253,816 B1 * | 2/2016 | Gashette | H04W 84/02 |

(Continued)

*Primary Examiner* — Dong-Chang Shiue
(74) *Attorney, Agent, or Firm* — Christopher A. Monsey

(57) ABSTRACT

Exemplary apparatuses and methods are provided associated with an unobtrusive router/relay system (URRS) configured to communicate with a plurality of radio frequency (RF) systems including a first radio frequency (RF) system (e.g. a cell phone, RF system carried or used by an individual or team, etc.), other URRS systems (which each include a second RF receiver/transmitter), and an RF communication's hub (e.g. cell tower, tethered UAV, control center, etc.). Locations are identified for a specific location or number of locations along a transit path where the RF communication's hub lacks transmit/receive coverage with the first RF system. URRS are positioned in the locations or transit path lacking RF communication hub transmit/receive coverage. The exemplary URRS are configured to route/relay the first RF system's signals to the RF communications' hub directly or through one or more other URRS systems. URRS are designed to blend with their surroundings.

7 Claims, 5 Drawing Sheets

Related U.S. Application Data

(60) Provisional application No. 62/161,920, filed on May 15, 2015.

(51) Int. Cl.
*H04W 52/02* (2009.01)
*H04B 7/26* (2006.01)
*H04B 7/185* (2006.01)
*G01S 5/02* (2010.01)

(52) U.S. Cl.
CPC ....... *H04B 7/18504* (2013.01); *H04B 7/2606* (2013.01); *H04W 52/0235* (2013.01); *Y02B 60/50* (2013.01); *Y02D 70/00* (2018.01)

(56) References Cited

U.S. PATENT DOCUMENTS

| | | | |
|---|---|---|---|
| 2007/0144779 A1* | 6/2007 | Vicente | H05B 37/0254 174/520 |
| 2009/0185036 A1 | 7/2009 | Bowron | |
| 2011/0079214 A1* | 4/2011 | Hon | F24J 2/542 126/573 |
| 2016/0005300 A1* | 1/2016 | Laufer | G08B 21/245 340/573.1 |
| 2016/0192037 A1* | 6/2016 | Hernandez | H04L 49/40 370/400 |

\* cited by examiner

Method of Designing, Making and Using an Unobtrusive Router/Relay system (URRS)

21 — Determine a location or transit path for a first person, team of persons, or a remotely operated vehicle that carry a first radio frequency (RF) system that is outside of the first RF system reception range with a predetermined RF communication hub at the location of one or more sections of the transit path, wherein said RF communication hub is configured to communicate with at least one other entity comprising a second person or team of persons;

23 — Determine a range for an unobtrusive router/relay system (URRS) comprising an encasing structure, a second radio frequency (RF) receiver/transmitter configured to with message storage and relay system, solar panel, battery, a power control system, and wiring system coupling the second RF receiver/transmitter, solar panel, battery, and power control system;

25 — Determine one or more placement locations of one or more said URRS systems at said location or along said transit path that is outside of the RF systems reception range at the location of one or more sections of the transmit path so as to ensure said first RF system is within RF systems reception range of said URRS systems at each said placement location so as to ensure none of said locations or transit path is outside RF system reception range, wherein each said URRS is configured to relay or communicate signals from said first RF system to said predetermined RF communication hub through said area outside of the first RF system's reception range with said RF communication hub;

27 — Determine a shape, texture, and color of one or more objects in an area of the location or a transit path that are at or within no more than one mile or kilometer of the location or transit path, wherein each said URRS is formed with said encasing structure having at least part of said shape, texture, and color of at least one of said one or more objects, wherein said objects comprise at least one from a group of rock, geologic formation, vegetation comprising a tree, or human made structure or object found at said one or more placement locations;

Fig. 2A

29 — Provide or manufacture said one or more URRS with said shape, texture, and color;

31 — Placing said URRS at said one or more placement locations with said solar panel oriented away from a ground orientation and towards a sky orientation, wherein said placing step comprising one of a group of airdropping said URRS or a placement from a ground placement approach comprising a manual release by a human or a remotely operated vehicle placement, wherein said URRS configured for said airdropping placing step further comprising a self-righting mechanism comprising a gravity sensing sensor, an orientation control system, and either a plurality of jack extensions that selectively extend and roll said URRS to self-right and orient said solar panel skyward or a plurality of biased wire or petal structures configured extend away from said URRS from hinge sections to self-right said URRS and orient said solar panel skywards; and 33 — Activate said first RF system to communication with at least one said URRS system which in turn relays said signals to said RF communication hub, wherein said URRS is dormant in a receive only mode until first RF system activates said URRS system with an activation code.

Fig. 2B

UNOBTRUSIVE COMMUNICATION OR NETWORK COVERAGE EXTENDER (URRS) AND RELATED SYSTEM ARCHITECTURES

| 63 Solar power system | 71 Solar power stored in Li battery keeping it topped off | 79 BURST POWER CAPACITANCE CIRCUITRY |
| --- | --- | --- |
| 65 Tamper resistant self destruct | 73 PETN cord trigger with remote signal activation | 81 Safety trigger pull slip on deployment |
| 67 Wireless hot spot camoflaged | 75 Non-detect network range/node | 83 Ester cyonate composite (low resistance to RF) |
| 69 Tethered UAV SAT LINK Base | 77 SAT PHONE | 85 Two central links for redundant uplink coverage |

Fig. 4

SYSTEM AND METHODS FOR UNOBTRUSIVELY AND RELOCATEABLY EXTENDING COMMUNICATION COVERAGE AND SUPPORTING UNMANNED AERIAL VEHICLE (UAV) ACTIVITIES

CROSS-REFERENCE TO RELATED APPLICATIONS

The present application is a Divisional Non-Provisional, which claims priority to U.S. Pat. No. 9,877,208 entitled "SYSTEM AND METHODS FOR UNOBTRUSIVELY AND RELOCATEABLY EXTENDING COMMUNICATION COVERAGE" issued on Jan. 23, 2018" which is related to U.S. Provisional Patent Application Ser. No. 62/161,920, filed May 15, 2015, entitled "SYSTEM AND METHODS FOR UNOBTRUSIVELY AND RELOCATEABLY EXTENDING COMMUNICATION COVERAGE," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,240) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

Systems and methods for unobtrusively and relocateably extending communication coverage. A need exists for providing extension of coverage of communications systems in areas like national parks, remote areas, or even hostile areas where parties may wish to tamper with an exemplary router/relay system. Such communication systems must blend into their surroundings and remain dormant until required for use. They must also be capable of being powered remotely.

According to an illustrative embodiment of the present disclosure, an unobtrusive router/relay system (URRS) is configured to communicate with a plurality of radio frequency (RF) systems including a first radio frequency (RF) system (e.g. a cell phone, RF system carried or used by an individual or team, unmanned airborne vehicle (UAV) or remotely operated vehicle (ROV) relay node, etc.), other URRS systems (which each include a second RF receiver/transmitter), and an RF communication's hub (e.g. cell tower, control center, UAV relay node, etc.). Locations are identified for a specific location or number of locations along a transit path where the RF communication's hub lacks transmit/receive coverage with the first RF system. URRS are positioned in the locations or transit path lacking RF communication hub transmit/receive coverage. The URRS are configured to route/relay the first RF system's signals to the RF communications' hub directly or through one or more other URRS systems. URRS are designed to blend with their surroundings such as being formed to appear as a rock or a fallen tree.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 2A and 2B show an exemplary method of designing, making and using an exemplary URRS in accordance with one embodiment of the invention;

FIG. 4 shows a simplified block diagram of an exemplary URRS in accordance with one embodiment of the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
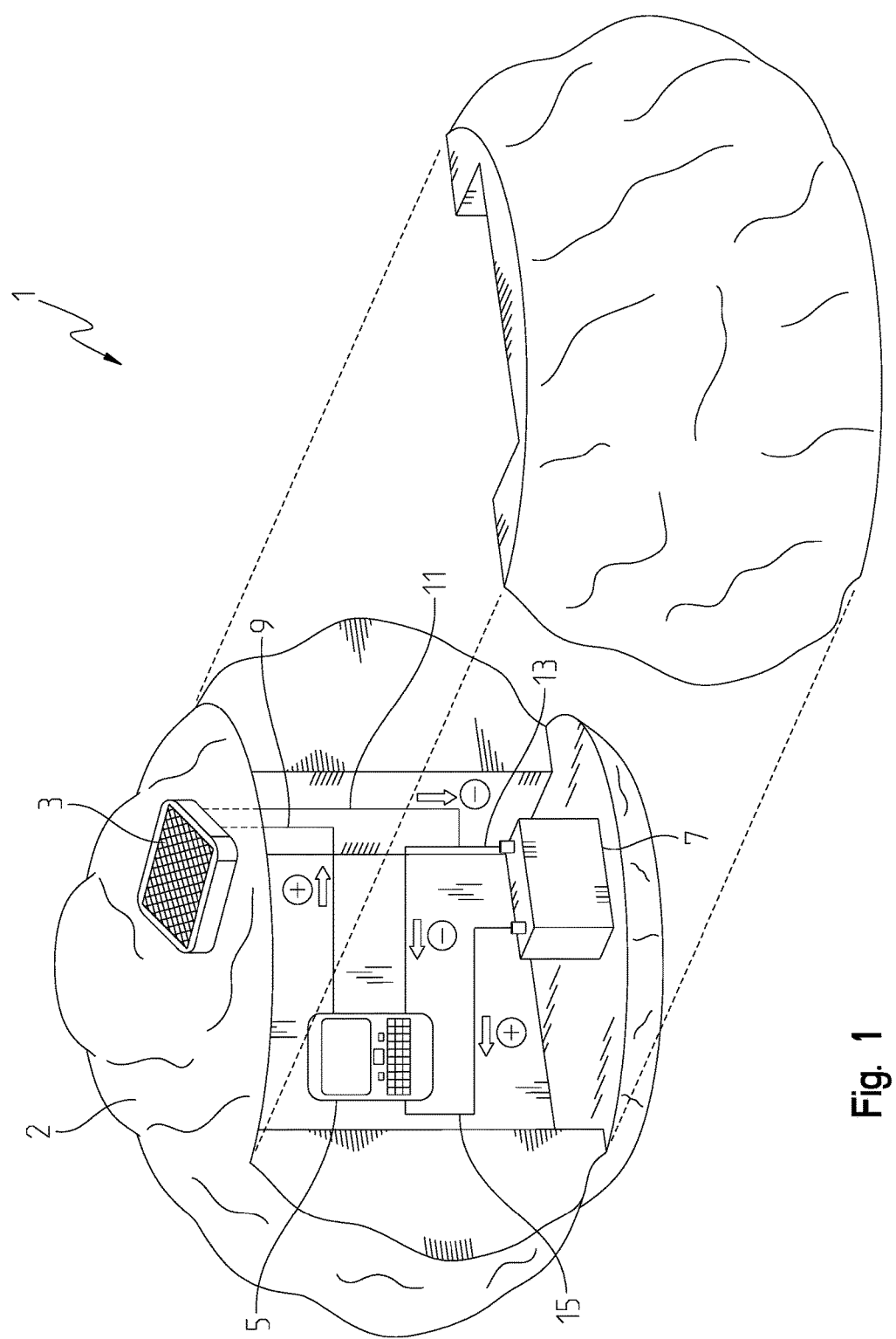
FIG. 1 shows a solar and battery source powered URRS exemplary embodiment utilizing a modified cell phone as a router or relay system within a structure designed to blend in with a surrounding terrain (e.g. a rock with a solar panel which is colored/textured to blend with the rock)

Referring initially to FIG. 1, an exemplary unobtrusive router/relay system (URRS) 1 configured to communicate with a plurality of radio frequency systems (RF) comprising a first RF (not shown), other URRS 1 systems, and an RF communication's hub (not shown). The URRS 1 comprising an encasing structure 2 (e.g. a rock like or rock structure), a second RF receiver/transmitter 5 configured with message storage and relay system configured to communicate with the plurality of RF systems, a solar panel 3, battery 7, a power control system (not shown but can be included in the second RF receiver/transmitter 5), and wiring system (9, 11, 13, 15) coupling the second RF receiver/transmitter 5, the solar panel 3, the battery 7, and power control system (not shown) are shown. The encasing structure 2 can be formed with a rock form comprising an irregularly shaped structure or form and a predetermined color such as tan or black based on a placement location. The encasing structure 2 can be formed from a lightweight material such as foam, wire with a coating or cover, or a naturally occurring material such as rock, vegetable or tree matter.

An embodiment can be designed for a variety of placements, configurations or approaches. For example, an alternative embodiment airdrop variant URRS (not shown) can be configured for an airdrop placing step which can further include a self-righting mechanism comprising a gravity sensing sensor, an orientation control system, and either a plurality of jack extensions that selectively extend and roll the airdrop variant URRS to self-right and orient said solar panels sky ward or a plurality of biased wire or petal structures configured to extend away from the airdrop variant URRS from hinge sections to self-right the airdrop variant URRS and orient said solar panel skywards.

An exemplary URRS 1 can be designed to be activated by the first RF system to communicate with at least one of the URRS system 1 which in turn relays signals from the first RF system to the RF communication hub. The URRS 1 can be configured to be dormant in a receive-only mode until the first RF system activates the URRS 1 system with an activation code (e.g. an encrypted code). An embodiment of the URRS 1 can have a control panel (not shown) which enables or permits input of data inputs or manual messages or activation of predetermined messages (including through means such as a series of action buttons or stored messages selected through the control panel) such as a request for assistance (e.g. rescue, requesting specific action such as providing supplies to a location where the URRS 1 is located, or a text input message). The control panel can provide access to the second RF system 5 directly which can also receive an interface from a control system such as a keyboard and display combination (not shown).

Referring to FIGS. 2A and 2B, a method of designing, making and using an exemplary URRS is shown. At Step 21: Determining a location or transit path for a first person, team of persons, or a remotely operated vehicle, solar powered UAVs, balloon or dirigible or zeppelin systems, tethered UAV (e.g. tethered by a long power and/or data cable to a ground station that permits long duration orbits or flight areas), that carry a first radio frequency (RF) mobile system that is outside of the first RF mobile systems reception range with a predetermined RF communication hub at the location or one or more sections of the transit path, wherein said RF communication hub is configured to communicate with at least one other entity comprising a second person or team of persons. At Step 23: Determining or selecting an RF range for the URRS, wherein the URRS comprises an encasing structure, a second radio frequency (RF) receiver/transmitter with said range configured to communicate with said first RF mobile system as well as said RF communication hub that is configured to communicate with remote communication systems, the second RF receiver/transmitter is further configured with a message storage and relay system, the URRS further includes a solar panel, battery, a power control system (e.g. configured to receive power from the solar panel and power the battery and the second RF receiver/transmitter), and wiring system coupling the second RF receiver/transmitter, solar panel, battery, and power control system. At Step 25: Determine one or more placement locations of one or more said URRS systems at said location or along said transit path that is outside of the RF communication hub reception range so as to ensure said first RF mobile system is within RF systems reception range of at least one of said URRS systems at each said placement location along said transit path or at said location, wherein each said URRS is configured to relay or communicate signals from said first RF system to said RF communication hub through said area outside of the first RF systems' range with said RF communication hub. At Step 27: Determine a shape, texture, and color of one or more objects in an area of the location or a transit path that are at or within no more than one mile or kilometer of the location or transmit path, wherein each said URRS is formed with said encasing structure having at least part of said shape, texture, and color of at least one of said one or more objects, wherein said objects comprise at least one from a group of rock, geologic formation, vegetation comprising a tree, or human made structure or object found at said one or more placement locations. At Step 29: Provide or manufacture said one or more URRS with said shape, texture, and color. At Step 31: Placing said URRS at said one or more placement locations with said solar panel oriented away from a ground orientation and towards a sky orientation, wherein said placing step comprising one of a group of airdropping said URRS or a placement from a ground placement approach comprising a manual release by a human or a remotely operated vehicle placement, tethered UAV, other UAVs/drones, etc. wherein said URRS configured for said airdropping placing step further comprising a self-righting mechanism comprising a gravity sensing sensor, an orientation control system, and either a plurality of jack extensions that selectively extend and roll said URRS to self-right and orient said solar panels sky ward or a plurality of biased wire or petal structures configured extend away from said URRS from hinge sections to self-right said URRS and orient said solar panel skywards. At Step 33: Activate said first RF system to communication with at least one said URRS system which in turn relays said signals to said RF communication hub, wherein said URRS is dormant in a receive only mode until said first RF system activates said URRS system with an activation code.

Additional embodiments can include additional elements such as a movement sensor or video camera(s) which activate automatically or by command which relay information on surroundings of the URRS systems to the first RF receiver/transmitter which then display information on a user interface showing such movement and/or video with respect to individual URRS systems. A user interface can permit selection of individual URRS systems and selective activation of such systems. A status system can also send out reports on status of URRS systems to include operational status, battery charge state, etc. An additional feature can include a deactivation command which wipes one or more URRS system memory which can be sent to the URRS system(s) as well as an automatic feature which occurs after, for example, a certain number of days or upon certain conditions being met such as a low battery state without solar charge correcting it for more than a certain time period (e.g. forty eight hours, etc.). Another alternate design can include a retrieval system such as a hook or even a balloon that is inflated by an inflation system which is extended through a cover in the enclosure which permits, for example, a remotely operated vehicle (ROV) or unmanned airborne vehicle (UAV) to pick up the URRS and retrieve it. The cover is designed to blend in with the URRS so it is not apparent upon a cursory visual inspection (e.g. same color as other sections etc.). The system can be designed to auto wipe when a cover is opened when the system does not receive an authorization command from the first radio or another RF system with a correct authorization code input into the URRS' second RF receiver/transmitter which has a stored look up file for such codes. Thus, the enclosure and covers can also have a switch which detects opening of the cover(s) which is coupled with a controller with associated machine readable instructions that configure the URRS to perform certain tasks such as auto wipe of memory or even activation of PETN destruct charges in the URRS designed to shatter internal electronic components. Other alternative embodiments can include a process or method where users on a team are transiting a path and dropping the URRS systems at intervals that overlap which each other's receive/transmit coverage and thus form a relay chain back to an RF communication hub such as a cell tower, tethered UAV node, or other communication node or command center. An embodiment can include a URRS having an RF system can also be capable of satellite communications with link to tethered UAV ground station link system.

Figure 3:
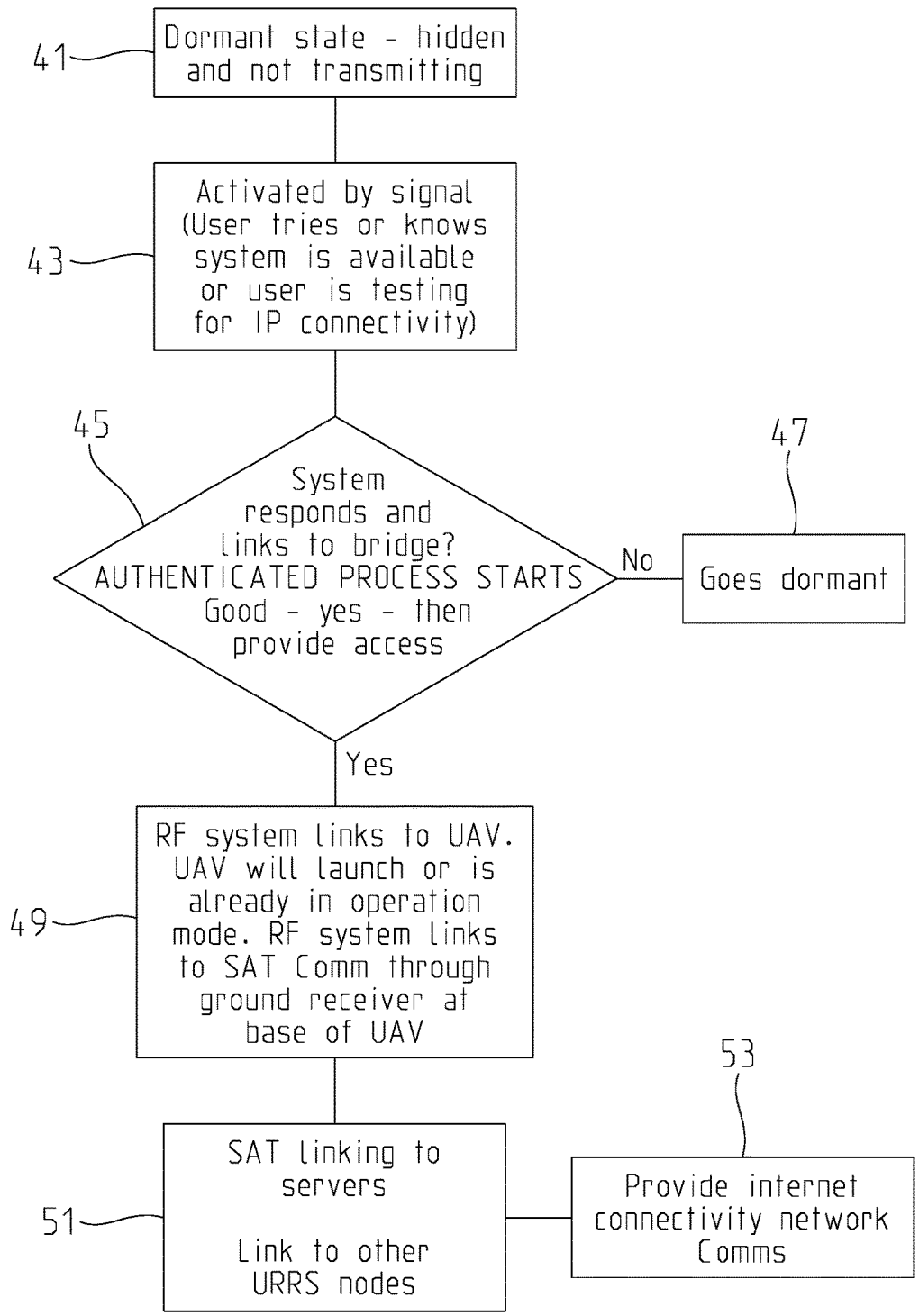
FIG. 3 shows a simplified method of operating an exemplary URRS with a UAV or ROV.

FIG. 3 shows a simplified method of operating an exemplary URRS with a UAV or ROV. An initial step (not shown) comprises providing a URRS in accordance with an embodiment of the invention (e.g. see herein). At step 41, the URRS is in a dormant and non-transmitting state. At step 43, an operator or user activates the URRS by a signal (e.g. a user tries or activates the URRS that is available or the operator performs a test for IP connectivity, etc.). At step 45, the URRS responds to the signal from step 43 and links to a bridge network or system then performs an authentication process with a bridge system which could be another URRS or another communication system (e.g. satellite system via a satellite communication system) which has two resulting states: Good or Yes, which then activates step 49 or No or Bad which executes step 47. At step 47, URRS goes dormant. At step 49, the URRS' RF system links to another communication system (e.g. a UAV), then the URRS's RF system links to another communication system (e.g. another URRS system or a satellite communication system (e.g. Iridium, etc.)) through a ground receiver at a UAV base or through the URRS. An embodiment of the invention can include a case where each URRS acts like a cell phone tower and a UAV can transit URRS coverage areas with the UAV switching to different URRS systems' coverage areas as it transits an area. A UAV can be configured to launch when it establishes a communication link with a first URRS in a network of URRS systems, by command of an operator, or upon detection of a predetermined event by a sensor network such as movement detected by individual URRS systems having a sensor configured for detecting a presence of movement or another sensor which detects a particular object or entity (e.g. a vehicle with an infrared sensor, an animal that is the focus of poachers such as an elephant) where a URRS system has a video processor, a video camera, and a shape recognition system that detects a combination of objects such as a vehicle and an elephant in a certain proximity. A URRS with additional sensors can be configured to turn on sensors at intervals to save power. Sensors can be light emitting diodes which can detect particular wavelengths of light, video systems, digital imagers, which can be disposed at different locations in a circumference of a URRS which provide coverage at desired fields of view (FOV). A URRS can be configured to take images at certain intervals and send them to a predetermined location or network node as well as to take such images when certain events occur such if a URRS is disturbed. A URRS can include an inertial navigation system or system for detecting movement of the URRS which then can activate a tamper mode which takes pictures of its surroundings and sends such images to a designated recipient or network node to assist in (for example, law enforcement) identifying individuals or entities that have disturbed a URRS. At step 51, the exemplary URRS operates a communication connection system (e.g. a satellite communication system) to link to a predetermined one or more servers or communication systems which in turn link to other system. At step 53, a URRS system establishes an Internet or other communication protocol connectivity network connection after the step 51 process is complete, to establish a data transmission capability.

FIG. 4 shows a simplified block diagram of an exemplary URRS 61 in accordance with one embodiment of the invention. URRS 61 and related systems architectures components can include a solar panel 63 for charging a battery 71, a tamper resistant/self-destruct system 65, and a wireless hot spot system 67 that is camouflaged or designed to blend in with its environment. One exemplary embodiment can include a tethered UAV/ROV with a satellite link and base station (TUAVSLB) 69 (not shown in detail) that the tether is connected to which provides power and controls inputs for the UAV/ROV. The exemplary TUAVSLB 69 systems are not physically part of this exemplary URRS 61; however, the exemplary URRS 61 systems and the TUAVSLB 69 are designed to work together via wireless communication (e.g. RF or optical communication systems). The exemplary URRS 61 also includes a battery 71 (e.g. lithium ion) that the solar power system 63 maintains a charge level in, a PETN self-destruct detonation cord trigger mechanism with remote signal activation 73 to prevent the URRS 61 device from being discovered or tampered with (e.g. by thieves, data pirates, hackers, criminals, or adverse parties, etc.) a network range/node system 75 which has a frequency that is not on a standard network Wi-Fi or router frequency that other URRS systems 61 or other network connection nodes are also on. An exemplary system remains off during non-use to prevent discovery. In one embodiment, an exemplary system lays dormant until the right password protected signal wakes it up when a first responder triggers a personal communication device that communicates with the URRS 61. A satellite phone which is included in this exemplary URRS 61 provides an independent communication link that does not need to go through other URRS systems 61 or a UAV/ROV 69 for communication with other entities like a command center or data network. This exemplary URRS 61 also includes a burst power capacitance circuitry 79 to improve range, maintain link, when weak signals are detected or a communications link is out of range of a node. The exemplary UAV and base station 69 (with launcher) also includes a safety trigger pull slip to activate battery upon deployment of e.g. a SAT LINK base system. For launching manually in one embodiment an automatic UAV launch system can also be provided that permits the UAV to be launched upon occurrence of a command to launch from an operator as well as automated conditions such as based on control logic in the TUAVSLB 69 which receives inputs from sensors (e.g. in one or more URRS systems 61) which trigger an automatic launch as well as a recovery routine either after a predetermined time aloft has occurred for the long tethered UAV or a condition such as no activity or movement detected/no electromagnetic spectrum activity detected passively by URRS systems or the TUAVSLB base station 69 which permits the UAV/ROV to return to ground and be reconfigured for launch. A UAV/ROV can be a propeller or electric engine thrust powered system or a quad copter or other persistent/long duration airborne platform (e.g. balloon, small dirigible, zeppelin, etc.). Components of various elements of this system 61 can be made from low RF resistance materials 83 such as ester cyanate composite. An embodiment of the invention (e.g. URRS, TUAVSLB 69, etc.) can include two central communications links 85 for redundant uplink coverage.

Embodiments of the invention can include UAV/ROV variants which are untethered or tethered which communicate with URRS systems 61 and TUAVSLB 69 systems that are dispersed over an area such as a patrol area or border (e.g. U.S. Mexico border). Such systems can have navigation paths which ensure overflight of URRS system 61 coverage areas so that communication connections between UAV/ROV 69 and URRS 61 systems are maintained over various flight paths. An embodiment can also include a system which flies over areas of scattered URRS 61 coverage where the UAV/ROV 69 has general locations or areas where URRS systems are located and that locates and communicates with such URRS systems 61 by sending out signals to activate URRS 61 communication coverage and activities during overflight and while within communication range, once out of range of each other, the active URRS system 61 would then go into a dormant mode once a communication link was broken and not re-established for more than a predetermined time period.

Embodiments of the invention can also include UAV/ROV systems that can also be designed to go to URRS 61 locations which have detected activity or movement (physical movement by motion detector), detection of specific preprogrammed shapes recognized by URRS 61 video/shape recognition systems (e.g. comparing pixel or bit maps of shapes with video images using fuzzy logic/mapping) which is then reported via SAT Phone 77 which passes an activity report to the TUAVSLB 69 which in turn launches the UAV/ROV or directs it to the activated URRS system 61 to take further action such as full motion video/video capture of objects or entities which the URRS system has detected/reported in. Operators can evaluate UAV/ROV data feeds to determine a next step which can include having the UAV/ROV track the detected objects and even perform signal detection such as seeking to query cell phones possessed by disturbing/tracked entities (persons, etc.) or do other signals collection activities.

An alternative embodiment can also include a location finding system comprising an optical, sound, or RF signal emitter configured to generate an optical, sound, RF, or infrared signal to enable location of a selected URRS location by a person in proximity to the selected URRS based on receipt by the second RF receiver/transmitter of an location finding system activation signal.

Although the invention has been described in detail with reference to certain preferred embodiments, variations and modifications exist within the spirit and scope of the invention as described and defined in the following claims.

The invention claimed is:

1. A communication system including an unobtrusive router / relay system (URRS) configured to communicate with a plurality of radio frequency (RF) systems comprising:
   an RF communication hub;
   a plurality of URRS each comprising a first radio frequency system (RF) and, each said URRS comprising:
      an encasing structure comprising an irregularly shaped structure configured with a first texture;
      a second RF receiver/transmitter configured with a message storage and relay system configured to communicate with the plurality of RF systems;
      a solar panel positioned on the encasing structure;
      a battery adapted to store energy from said solar panel and power said URRS;
      a power control system configured to control power from the solar panel to charge or power the battery and said second RF receiver/transmitter;
      a wiring system coupling the second RF receiver/transmitter, the solar panel, the battery, and power control system;
   wherein the encasing structure is formed from a material selected from the group: a material comprising foam or plastic, wire with a coating or cover, or a naturally occurring material comprising rock, vegetable or tree matter;
   wherein said URRS further comprises a control panel that is accessible under a cover formed into an enclosure which enables or permits input of data inputs or manual messages or activation of predetermined messages comprising a request for assistance comprising one or more of a request for rescue, requesting specific action such as providing supplies to a location where the URRS is located, or a text input message;
   wherein said control panel is further configured to provide access through the enclosing structure directly to the second RF system which can also receive an interface from another external control system such as a keyboard and display combination operable by an operator of the first RF receiver/transmitter.

2. A system as in claim 1, further comprising a self-righting mechanism comprising a sensor comprising either a light sensing sensor or a gravity sensing sensor powered by the battery, an orientation control system configured to receive signals from the gravity sensing sensor or light sensing sensor to determine orientation of the solar panel with respect to gravity or a solar energy source, and either a plurality of jack extensions that selectively extend and roll said URRS to self-right and orient said solar panels sky ward or a plurality of biased wire or petal structures configured to extend away from said URRS from hinge sections to self-right said URRS and orient said solar panel skywards.

3. A system as in claim 1, wherein said URRS is configured to be activated by the first RF system to communication with at least one said URRS system which in turn relays signals from the first RF system to the RF communication hub.

4. A system as claim 1, wherein the URRS is configured to be dormant in a receive-only mode until the first RF system activates the URRS system with an activation code.

5. A system as in claim 1, wherein said control panel further comprises a plurality of action buttons or stored messages selected through the control panel that are configured to automate selection of said predetermined message generation.

6. A system as in claim 1, further comprising a location finding system comprising an optical, sound, or RF signal emitter configured to generate an optical, sound, RF, or infrared signal to enable location of a selected URRS location by a person in proximity to the selected URRS based on receipt by the second RF receiver/transmitter of an location finding system activation signal.

7. A portable and relocatable router and relay system configured to blend with one or more environments and communicate with a plurality of radio frequency (RF) systems comprising:
   an RF communication hub configured to communicate with at least one first portable RF or optical communication system and one or more of a plurality of unobtrusive router / relay system (URRS), each said URRS comprising:
      an encasing structure comprising an irregularly shaped structure configured with a first texture;
      a second RF receiver/transmitter configured with a message storage and relay system configured to communicate with the plurality of RF systems including said first portable RF or optical communication system and other said plurality of URRS systems;
      a solar panel positioned on the encasing structure;
      a battery adapted to store energy from said solar panel and power said URRS;
      a power control system configured to control power from the solar panel to charge or power the battery and second RF receiver/transmitter;
      a wiring system coupling the second RF receiver/transmitter, the solar panel, the battery, and power control system;
      a self-righting mechanism comprising a sensor comprising either a light sensing sensor or a gravity sensing sensor powered by the battery, an orientation control system configured to receive signals from the gravity sensing sensor or light sensing sensor to determine orientation of the solar panel with respect to gravity or a solar energy source, and either a plurality of jack extensions that selectively extend and roll said URRS to self-right and orient said solar panels sky ward or a plurality of biased wire or petal structures configured to extend away from said URRS from hinge sections to self-right each said URRS and orient said solar panel skywards;

a location finding system comprising an optical, sound, or RF signal emitter configured to generate an optical, sound, RF, or infrared signal to enable location of a selected URRS location by a person in proximity to the selected URRS based on receipt by the second RF receiver/transmitter of an location finding system activation signal;

wherein the encasing structure is formed from a material selected from the group: a material comprising foam or plastic, wire with a coating or cover, or a naturally occurring material comprising rock, vegetable or tree matter;

wherein each said URRS is configured to be activated by the first portable RF or optical communication system to communication with at least one other said URRS which in turn relays signals from the first RF system to the RF communication hub;

wherein each said URRS is configured to be dormant in a receive-only mode until the second RF system receives an activation code and thereby activates a selected said URRS with said activation code;

wherein each said URRS further comprises a control panel that is accessible under a cover formed into said enclosure which enables or permits input of data inputs or manual messages or activation of predetermined messages comprising a request for assistance comprising one or more of a request for rescue, requesting specific action such as providing supplies to a location where the URRS is located, or a text input message;

wherein each said control panel further comprises a plurality of action buttons or stored messages selected through the control panel that are configured to automate selection of said predetermined message generation;

wherein each said URRS control panel is further configured to provide access through the enclosing structure directly to the second RF system which can also receive an interface from another and external control system such as a keyboard and display combination operable by an operator of the first RF receiver/transmitter.

* * * * *